US006467855B1

United States Patent
Cabral

(10) Patent No.: US 6,467,855 B1
(45) Date of Patent: Oct. 22, 2002

(54) WALL HANGING CASSETTE TAPE ORGANIZER

(76) Inventor: Richard S. Cabral, 3750 Avenue H, White City, OR (US) 97503

( * ) Notice: Subject to any disclaimer, the term of this patent is extended or adjusted under 35 U.S.C. 154(b) by 0 days.

(21) Appl. No.: 09/833,478

(22) Filed: Apr. 12, 2001

(51) Int. Cl.[7] .................................................. A47F 1/00
(52) U.S. Cl. ............................................. 312/42; 312/50
(58) Field of Search ............................. 312/35, 42, 43, 312/45, 50; 221/281, 303, 309

(56) References Cited

U.S. PATENT DOCUMENTS

| 1,673,812 | A | * | 6/1928 | Dunn ........................... 312/42 |
| 2,805,111 | A | * | 9/1957 | Jarnot .......................... 312/42 |
| 4,037,756 | A | * | 7/1977 | Jaquish ..................... 312/42 X |
| 4,058,354 | A | * | 11/1977 | Powaska ...................... 312/45 |
| 4,293,075 | A | | 10/1981 | Veralrud |
| 4,538,726 | A | * | 9/1985 | Pastva ....................... 312/42 X |
| 4,597,614 | A | * | 7/1986 | Alexander .................. 312/42 |
| 4,707,247 | A | | 11/1987 | Savoy |
| 4,819,801 | A | | 4/1989 | Howard |
| 4,881,787 | A | * | 11/1989 | King et al. ..................... 312/42 |
| 4,950,039 | A | | 8/1990 | Helling et al. |
| 5,135,135 | A | * | 8/1992 | Olivier ..................... 312/42 X |
| 5,456,384 | A | * | 10/1995 | Polvere et al. ............. 312/50 X |
| D364,512 | S | | 11/1995 | Stravitz |
| 5,685,423 | A | | 11/1997 | Hunt |
| 5,706,977 | A | * | 1/1998 | Ogura et al. ............... 312/42 X |
| 5,836,661 | A | * | 11/1998 | Oldorf .......................... 312/42 |
| 5,980,002 | A | | 11/1999 | Crowe |

FOREIGN PATENT DOCUMENTS

| DE | 3631828 | * | 4/1987 | ................... 312/42 |
| JP | 54012800 | * | 1/1979 | ................... 312/42 |

* cited by examiner

Primary Examiner—Lanna Mai
Assistant Examiner—Hanh V. Tran

(57) ABSTRACT

A wall hanging cassette tape organizer for allowing a user to keep tapes neat and organized, on a wall where they would be easily accessible and out of reach for children or pets and not take up any usable floor or table space. The wall hanging cassette tape organizer includes a housing that has an interior space defined by a back wall, a pair of sidewalls, upper end walls and a lower end wall. The interior space is adapted to store a plurality of cassettes. A mounting member is coupled to the upper end wall such that the mounting member is adapted to be removably secured the housing to a support surface.

11 Claims, 3 Drawing Sheets

WALL HANGING CASSETTE TAPE ORGANIZER

BACKGROUND OF THE INVENTION

1. Field of the Invention

The present invention relates to cassette storage devices and more particularly pertains to a new wall hanging cassette tape organizer for allowing a user to keep tapes neat and organized, on a wall where they would be easily accessible and out of reach for children or pets and not take up any usable floor or table space.

2. Description of the Prior Art

The use of cassette storage devices is known in the prior art. More specifically, cassette storage devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,819,801; 4,293,075; 5,685,423; Des. 364,512; 5,980,002; 4,950,039; and 4,707,247.

While these devices fulfill their respective, particular objectives and requirements, the aforementioned patents do not disclose a new wall hanging cassette tape organizer. The inventive device includes a housing that has an interior space defined by a back wall, a pair of sidewalls, upper end walls and a lower end wall. The interior space is adapted to store a plurality of cassettes. A mounting member is coupled to the upper end wall such that the mounting member is adapted to be removably secured the housing to a support surface.

In these respects, the wall hanging cassette tape organizer according to the present invention substantially departs from the conventional concepts and designs of the prior art, and in so doing provides an apparatus primarily developed for the purpose of allowing a user to keep tapes neat and organized, on a wall where they would be easily accessable and out of reach for children or pets and not take up any usable floor or table space.

SUMMARY OF THE INVENTION

In view of the foregoing disadvantages inherent in the known types of cassette storage devices now present in the prior art, the present invention provides a new wall hanging cassette tape organizer construction wherein the same can be utilized for allowing a user to keep tapes neat and organized, on a wall where they would be easily accessible and out of reach for children or pets and not take up any usable floor or table space.

The general purpose of the present invention, which will be described subsequently in greater detail, is to provide a new wall hanging cassette tape organizer apparatus and method which has many of the advantages of the cassette storage devices mentioned heretofore and many novel features that result in a new wall hanging cassette tape organizer which is not anticipated, rendered obvious, suggested, or even implied by any of the prior art cassette storage devices, either alone or in any combination thereof.

To attain this, the present invention generally comprises a housing that has an interior space defined by a back wall, a pair of sidewalls, upper end walls and a lower end wall. The interior space is adapted to store a plurality of cassettes. A mounting member is coupled to the upper end wall such that the mounting member is adapted to be removably secured the housing to a support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wall hanging cassette tape organizer apparatus and method which has many of the advantages of the cassette storage devices mentioned heretofore and many novel features that result in a new wall hanging cassette tape organizer which is not anticipated, rendered obvious, suggested, or even implied by any of the prior art cassette storage devices, either alone or in any combination thereof.

It is another object of the present invention to provide a new wall hanging cassette tape organizer, which may be easily and efficiently manufactured and marketed.

It is a further object of the present invention to provide a new wall hanging cassette tape organizer, which is of a durable and reliable construction.

An even further object of the present invention is to provide a new wall hanging cassette tape organizer which is susceptible of a low cost of manufacture with regard to both materials and labor, and which accordingly is then susceptible of low prices of sale to the consuming public, thereby making such wall hanging cassette tape organizer economically available to the buying public.

Still yet another object of the present invention is to provide a new wall hanging cassette tape organizer which provides in the apparatuses and methods of the prior art some of the advantages thereof, while simultaneously overcoming some of the disadvantages normally associated therewith.

Still another object of the present invention is to provide a new wall hanging cassette tape organizer for allowing a user to keep tapes neat and organized, on a wall where they would be easily accessible and out of reach for children or pets and not take up any usable floor or table space.

Yet another object of the present invention is to provide a new wall hanging cassette tape organizer which includes a housing that has an interior space defined by a back wall, a pair of sidewalls, upper end walls and a lower end wall. The interior space is adapted to store a plurality of cassettes. A mounting member is coupled to the upper end wall such that the mounting member is adapted to be removably secured the housing to a support surface.

Still yet another object of the present invention is to provide a new wall hanging cassette tape organizer that would not take up usable floor space or space on top of furniture.

Even still another object of the present invention is to provide a new wall hanging cassette tape organizer that would be easy to mount on a wall and would then provide storage for audio cassettes, keeping them organized and out of reach for younger children or pets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
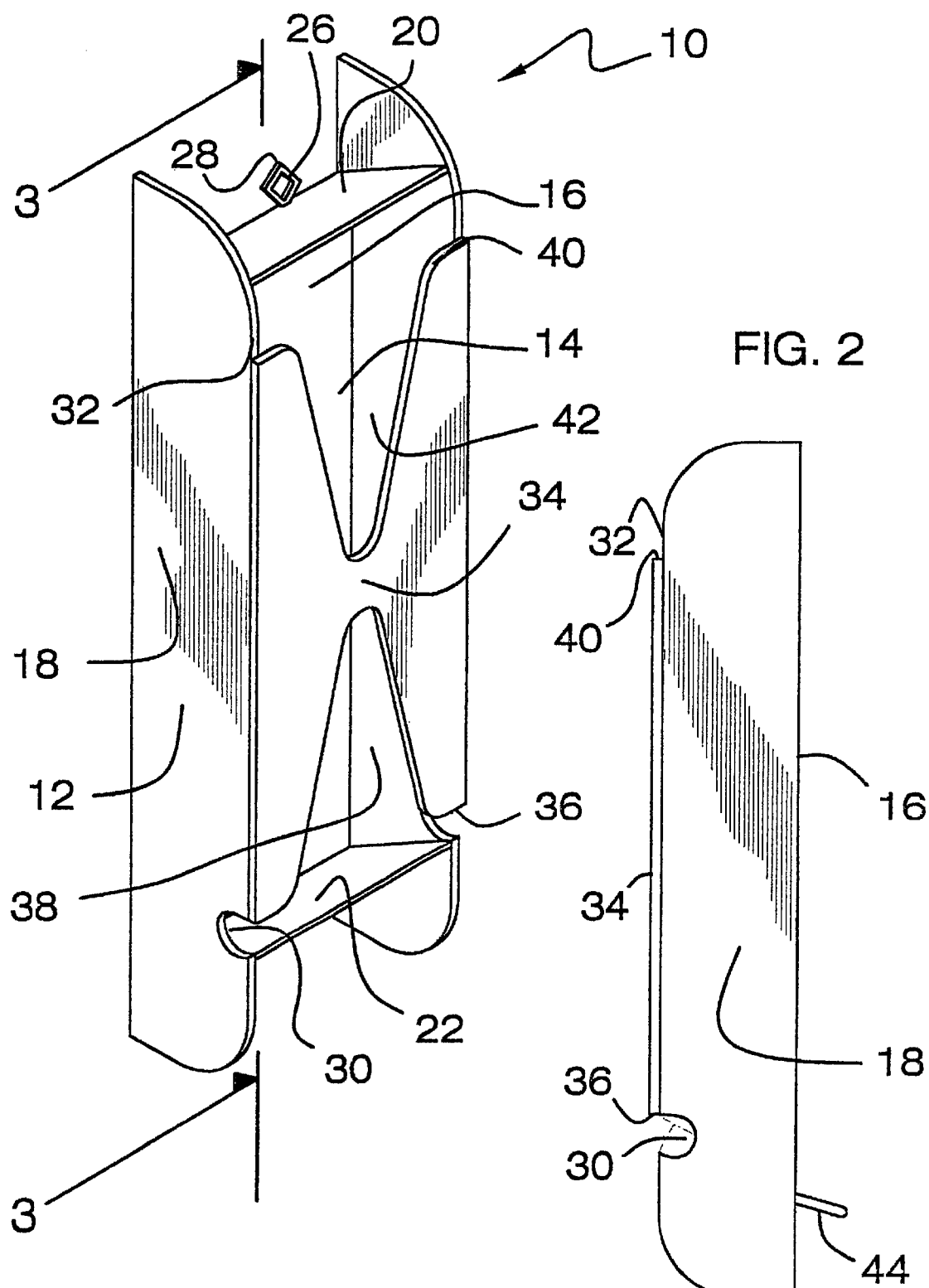
FIG. 1 is a perspective view of a new wall hanging cassette tape organizer according to the present invention.
FIG. 2 is a side view of the present invention.
Figure 3:
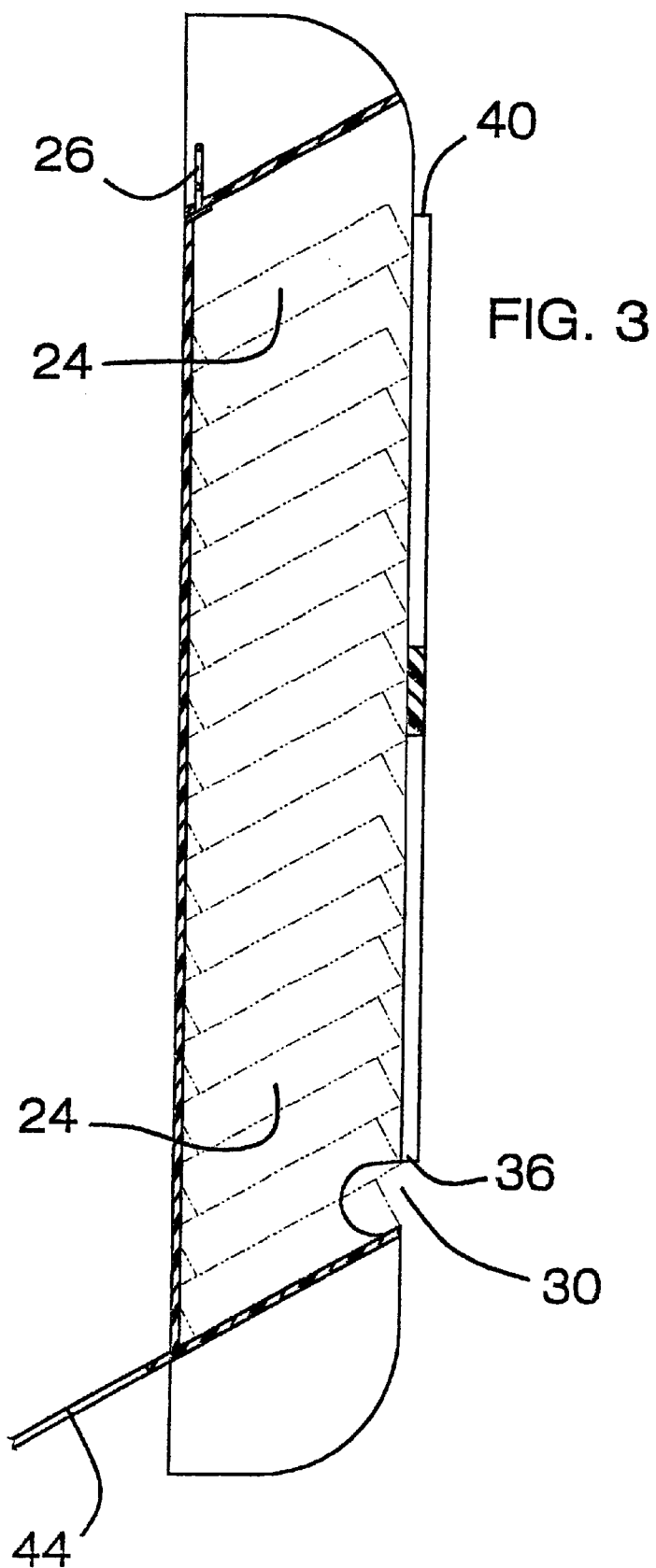
FIG. 3 is a cross-sectional view of the present invention.
Figure 4:
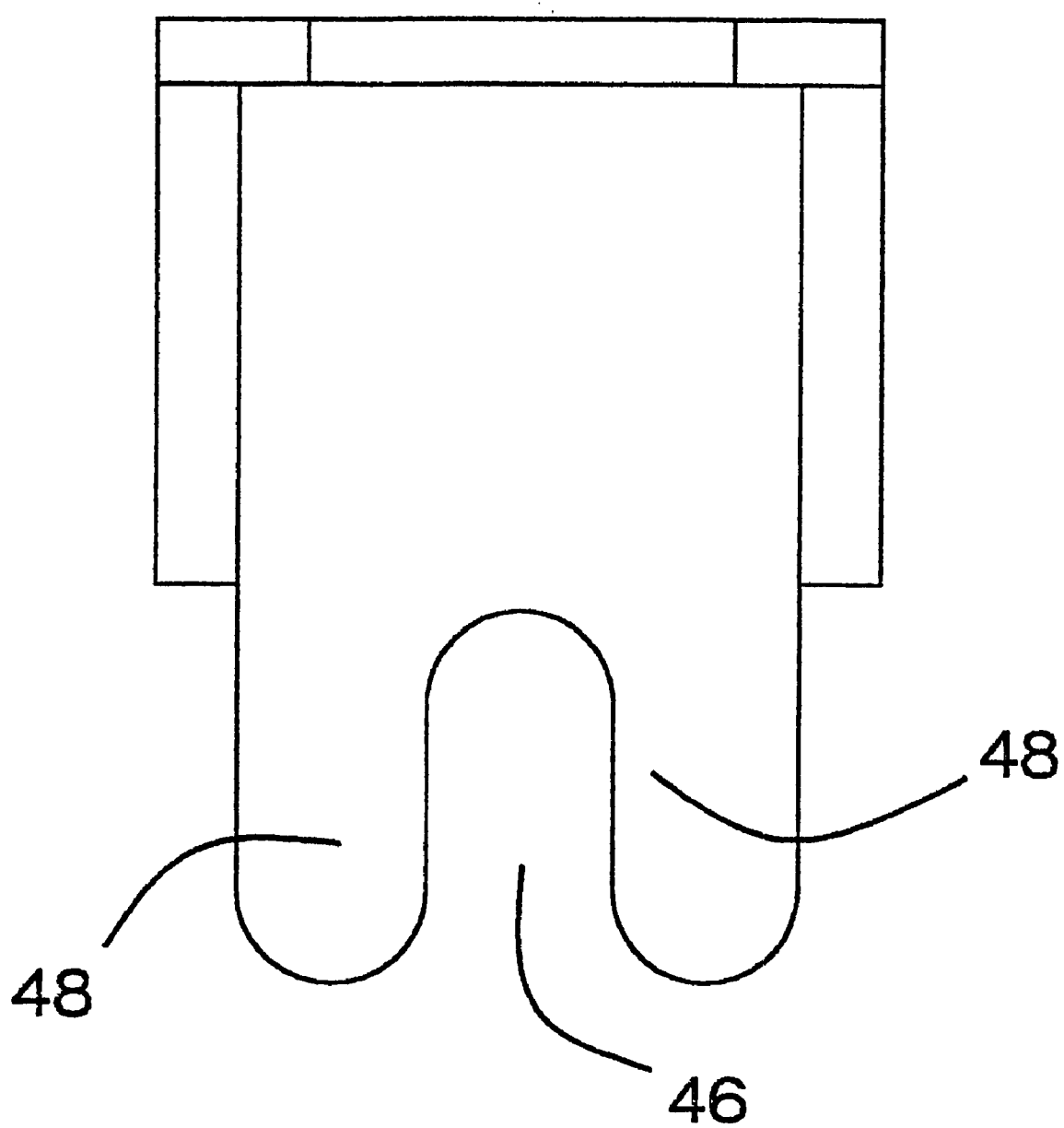
FIG. 4 is a bottom view of the present invention.

With reference now to the drawings, and in particular to FIGS. 1 through 4 thereof, a new wall hanging cassette tape organizer embodying the principles and concepts of the present invention and generally designated by the reference numeral 10 will be described.

As best illustrated in FIGS. 1 through 4, the wall hanging cassette tape organizer 10 generally includes a housing 12 that has an interior space 14 defined by a back wall 16, a pair of sidewalls 18, upper end walls 20 and a lower end wall 22. The interior space 14 is adapted to store a plurality of cassettes 24. A mounting member 26 is coupled to the upper end wall 20 such that the mounting member 26 is adapted to be removably secured the housing 12 to a support surface.

The mounting member 26 is substantially diamond shape whereby the mounting member 26 is adapted for a nail to be received in the support surface through an apex 28 of the mounting member 26 for minimizing the mounting member 26 sliding along the nail.

The upper end wall 20 and the lower end wall 22 extend outwardly and upwardly at an angle from the back wall 16 such that the end walls are adapted for storing the cassettes 24 at an incline for preventing the cassettes 24 from sliding out of the interior space 14 of the housing 12.

The side walls 18 extend beyond the upper end wall 20 such that the side walls 18 are for concealing the mounting member 26 coupled to the upper end wall 20 from is viewed. Each of the side walls 18 has a cutout 30 that inwardly extends from a front edge 32 of each of the side wall 18, the cutout 30 of each of the side walls 18 is positioned proximate the lower end wall 22 such that the cutout 30 of each of the side walls 18 is adapted for facilitating removal of the cassette 24 resting directly on the lower end wall 22 by a hand of a user.

A front wall 34 is coupled to the end walls and the side walls opposite the back wall 16 adapted for retaining the cassettes 24 within the interior space 14 of the housing 12. The front wall 34 has a bottom edge 36 spaced above the lower end wall 22 adapted for facilitating removal of the cassette 24 resting directly on the lower end wall 22. The front wall 34 has an upward tapering slot 38 that upwardly extends from the bottom edge 36 of the front wall 34. The upward tapering slot 38 is adapted for permitting the user to view labels of the cassettes 24 before removing the cassettes 24 from the interior space 14 of the housing 12. The front wall 34 has an upper edge 40 positioned below the upper end wall 20 adapted for permitting insertion of the cassette 24 in the interior space 14 of the housing 12. The front wall 34 has a downward tapering slot 42 that downwardly extends from the top edge of the front wall 34. The downward tapering slot 42 is adapted for permitting the user to view labels of the cassettes after inserting the cassettes into the interior space 14 of the housing 12.

The lower end wall 22 has a bracing portion 44 that outwardly extends and is downwardly angled from the back wall 16 of the housing 12. The bracing portion 44 is adapted to be braced against the support surface for minimizing rolling of the housing 12 with respect to the support structure 50.

The bracing portion 44 has a gap 46 between a pair of arms 48 such that the gap 46 is adapted to receive at least one finger of the user for supporting the housing 12 when the housing 12 is removed from the support structure.

In an embodiment the present invention could consist of the following physical size: 20 inches in height, 12 inches in length, and 5.5 inches in width.

In use, a user would mount the present invention to a wall. The user could then fill the present invention with standard audio cassettes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cassette storage device for storing cassettes, the cassette storage device comprising:

a housing having an interior space defined by a back wall, a pair of side walls, an upper end wall and a lower end wall, said interior space being adapted for storing a plurality of cassettes, a rear edge of each of said side walls being positioned adjacent said back wall such that said side walls extend from said back wall;

a mounting member being coupled to said upper end wall such that said mounting member is adapted for removably securing said housing to a support surface; and said lower end wall having a bracing portion outwardly extending and downwardly angled from said back wall of said housing such that said bracing portion is adapted for being positioned between said back wall and the support surface for positioning said back wall at an angle with respect to the support surface, said bracing portion being adapted for bracing against the support surface for minimizing rolling of said housing with respect to the support structure.

2. The cassette storage device as set forth in claim 1, wherein said mounting member is substantially diamond shape whereby said mounting member is adapted for receiving a nail in the support surface through an apex of said mounting member for minimizing mounting member sliding along the nail.

3. The cassette storage device as set forth in claim 1, wherein said upper end wall and said lower end wall extend outwardly and upwardly at an angle from said back wall such that said end walls are adapted for storing the cassettes at an incline for preventing the cassettes from sliding out of said interior space of said housing.

4. The cassette storage device as set forth in claim 1, wherein each of said side walls extend beyond said upper end wall such that said side walls are for concealing said mounting member coupled to said upper end wall from being viewed.

5. The cassette storage device as set forth in claim 1, wherein each of said side walls has a cutout inwardly extending from a front edge of each of said side wall, said cutout of each of said side walls being positioned proximate said lower end wall such that said cutout of each of said side walls is adapted for facilitating removal of the cassette resting directly on said lower end wall by a hand of a user.

6. The cassette storage device as set forth in claim 1, further comprising:

a front wall being coupled to said side walls opposite said back wall adapted for retaining the cassettes within said interior space of said housing, said front wall having a bottom edge spaced above said lower end wall adapted for facilitating removal of the cassette resting directly on said lower end wall.

7. The cassette storage device as set forth in claim 6, wherein said front wall has an upward tapering slot upwardly extending from said bottom edge of said front wall, said upward tapering slot being adapted for permitting the user to view labels of the cassettes before removing the cassettes from said interior space of said housing.

8. The cassette storage device as set forth in claim 6, wherein said front wall has an upper edge positioned below said upper end wall adapted for permitting insertion of the cassette in said interior space of said housing.

9. The cassette storage device as set forth in claim 8, wherein said front wall has a downward tapering slot downwardly extending from said top edge of said front wall, said downward tapering slot being adapted for permitting the user to view labels of the cassettes after inserting the cassettes into said interior space of said housing.

10. The cassette storage device as set forth in claim 1, wherein said bracing portion having a gap between a pair of arms such that said gap is adapted for receiving at least one finger of the user for supporting said housing when said housing is being removed from the support structure.

11. A cassette storage device for storing cassettes, the cassette storage device comprising:

a housing having an interior space defined by a back wall, a pair of side walls, an upper end wall and a lower end wall, said interior space being adapted for storing a plurality of cassettes, a rear edge of each of said side walls being positioned adjacent said back wall such that said side walls extend from said back wall;

a mounting member being coupled to said upper end wall such that said mounting member is adapted for removably securing said housing to a support surface;

wherein said mounting member is substantially diamond shape whereby said mounting member is adapted for receiving a nail in the support surface through an apex of said mounting member for minimizing mounting member sliding along the nail;

wherein said upper end wall and said lower end wall extend outwardly and upwardly at an angle from said back wall such that said end walls are adapted for storing the cassettes at an incline for preventing the cassettes from sliding out of said interior space of said housing;

wherein each of said side walls extend beyond said upper end wall such that said side walls are for concealing said mounting member coupled to said upper end wall from being viewed;

wherein each of said side walls has a cutout inwardly extending from a front edge of each of said side wall, said cutout of each of said side walls being positioned proximate said lower end wall such that said cutout of each of said side walls is adapted for facilitating removal of the cassette resting directly on said lower end wall by a hand of a user;

wherein a front wall being coupled to said side walls opposite said back wall adapted for retaining the cassettes within said interior space of said housing, said front wall having a bottom edge spaced above said lower end wall adapted for facilitating removal of the cassette resting directly on said lower end wall;

wherein said front wall has an upward tapering slot upwardly extending from said bottom edge of said front wall, said upward tapering slot being adapted for permitting the user to view labels of the cassettes before removing the cassettes from said interior space of said housing;

wherein said front wall has an upper edge positioned below said upper end wall adapted for permitting insertion of the cassette in said interior space of said housing;

wherein said front wall has a downward tapering slot downwardly extending from said top edge of said front wall, said downward tapering slot being adapted for permitting the user to view labels of the cassettes after inserting the cassettes into said interior space of said housing;

wherein said lower end wall has a bracing portion outwardly extending and downwardly angled from said back wall of said housing such that said bracing portion is adapted for being positioned between said back wall and the support surface for positioning said back wall at an angle with respect to the support surface, said bracing portion being adapted for bracing against the support surface for minimizing rolling of said housing with respect to the support structure;

wherein said bracing portion having a gap between a pair of arms such that said gap is adapted for receiving at least one finger of the user for supporting said housing when said housing is being removed from the support structure.

* * * * *